(12) United States Patent
Serebrennikov (10) Patent No.: US 9,679,002 B2
(45) Date of Patent: Jun. 13, 2017

(54) METHOD FOR PRODUCING AND USING A RECURSIVE INDEX OF SEARCH ENGINES

(76) Inventor: Oleg Aleksandrovich Serebrennikov, Moscow (RU)

( * ) Notice: Subject to any disclaimer, the term of this patent is extended or adjusted under 35 U.S.C. 154(b) by 538 days.

(21) Appl. No.: 14/238,667

(22) PCT Filed: Aug. 7, 2012

(86) PCT No.: PCT/RU2012/000637
§ 371 (c)(1),
(2), (4) Date: Apr. 14, 2014

(87) PCT Pub. No.: WO2013/022384
PCT Pub. Date: Feb. 14, 2013

(65) Prior Publication Data
US 2014/0214852 A1    Jul. 31, 2014

(30) Foreign Application Priority Data
Aug. 9, 2011 (RU) .................................. 2011133310

(51) Int. Cl.
*G06F 17/30* (2006.01)
*G06F 17/27* (2006.01)

(52) U.S. Cl.
CPC ...... *G06F 17/30321* (2013.01); *G06F 17/277* (2013.01); *G06F 17/30613* (2013.01); *G06F 17/30631* (2013.01); *G06F 17/30646* (2013.01); *G06F 17/30731* (2013.01)

(58) Field of Classification Search
CPC ......... G06F 17/30321; G06F 17/30613; G06F 17/277; G06F 17/30631; G06F 17/30646; G06F 17/30731
See application file for complete search history.

(56) References Cited

U.S. PATENT DOCUMENTS

| | | | | |
|---|---|---|---|---|
| 5,745,889 A | * | 4/1998 | Burrows | ........... G06F 17/30622 |
| 2003/0158850 A1 | * | 8/2003 | Lawrence | ......... G06F 17/30616 |
| 2006/0253518 A1 | | 11/2006 | Argentar | |
| 2010/0121856 A1 | | 5/2010 | Lei et al. | |
| 2010/0332511 A1 | | 12/2010 | Stockton et al. | |

FOREIGN PATENT DOCUMENTS

| | | |
|---|---|---|
| RU | 2 272 879 C2 | 5/2002 |
| WO | 2009/108459 A2 | 9/2009 |

OTHER PUBLICATIONS

Johnson, Damn Cool Algorithms: Spatial indexing with Quadtrees and Hilbert Curves, Nov. 2009, pp. 1-7.*
Stantic et al., ADBIS 2010, LNCS 6295, Indexing Temporal Data with Virtual Structure, 2010 pp. 591-594.*

* cited by examiner

*Primary Examiner* — Albert Phillips, III
(74) *Attorney, Agent, or Firm* — Sughrue Mion, PLLC (57) ABSTRACT

A method and an apparatus for creating and using recursive index in search engines. In particular, extracting text from an index of a search engine starting at an arbitrary position in the text, and analyzing texts for co-occurrence of words, and using said extraction and analysis for inferring implicit relationships among objects in sequences thereof. As such, utility of search engines to index and retrieve information represented by a sequence of objects different from text information objects are extended. A method and an apparatus extends the basic hit with at least two word identifications, one for the previous word and one for the next word.

34 Claims, 7 Drawing Sheets

| Basic Hit | Previous Word ID | Next Word ID |
|---|---|---|
|  | Previous Position | Next Position |

Fig. 3.

| Basic Hit | Previous Word ID | Next Word ID |
|---|---|---|

Fig. 4.

Though the night was made for loving,
  And the day returns too soon,
Yet we'll go no more a-roving
  By the light of the moon.

Fig. 5.

| Text start | though | | | | | | | |
|---|---|---|---|---|---|---|---|---|
| | Hit 1 | | Hit 2 | | Hit 3 | | Hit 4 | |
| lexicon\hit | Previous | Next | Previous | Next | Previous | Next | Previous | Next |
| a-roving | more | by | | | | | | |
| and | loving | the 2 | | | | | | |
| by | a-roving | the 3 | | | | | | |
| day | the 2 | returns | | | | | | |
| for | made | loving | | | | | | |
| go | ll | no | | | | | | |
| light | the 3 | of | | | | | | |
| ll | we | go | | | | | | |
| loving | for | and | | | | | | |
| made | was | for | | | | | | |
| moon | the 4 | . | | | | | | |
| more | no | a-roving | | | | | | |
| night | the 1 | was | | | | | | |
| no | go | more | | | | | | |
| of | light | the 4 | | | | | | |
| returns | day | too | | | | | | |
| soon | too | yet | | | | | | |
| the | though | night | and | day | by | light | of | moon |
| though | . | the 1 | | | | | | |
| too | returns | soon | | | | | | |
| was | night | made | | | | | | |
| we | yet | ll | | | | | | |
| yet | soon | we | | | | | | |

Fig. 6.

| plain: | cap: 1 | imp: 3 | position: 12 | | | Previous WordID | Next WordID |
|---|---|---|---|---|---|---|---|
| fancy: | cap: 1 | imp = 7 | type: 4 | position: 8 | | | |
| anchor: | cap: 1 | imp = 7 | type: 4 | hash: 4 | position: 4 | | |

| Basic Hit | PrevID | NextID |
|---|---|---|

Fig. 9.

| Basic Hit | Previous WordID | Next Next WordID | MetaID |
|---|---|---|---|

| plain:   | cap: 1 | imp: 3   | position: 12 |         |             |
|----------|--------|----------|--------------|---------|-------------|
| phrase:  | cap: 1 | imp = 0  | type: 2      | position: 10 |       |
| fancy:   | cap: 1 | imp = 7  | type: 4      | position: 8  |       |
| anchor:  | cap: 1 | imp = 7  | type: 4      | hash: 4 | position: 4 |

Hit for TimeStamp

| Position | Prev. TimeStamp | Next TimeStamp | MetaID | Location |
|---|---|---|---|---|
| | | | | |

Fig. 19.

Hit for Location

| Position | Prev. Location | Next Location |
|---|---|---|
| | | |

Fig. 20.

Hit for Location

| Position | TimeStamp | Prev. Location | Nex Location |
|---|---|---|---|
| | | | |

Fig. 21.

METHOD FOR PRODUCING AND USING A RECURSIVE INDEX OF SEARCH ENGINES

The present invention pertains generally to the field of computer science and digital data processing.

More specifically, the present invention pertains to a certain method of creation and use of a recursive index for search engines.

The present invention also pertains to extraction of text from an index of a search engine starting at an arbitrary position in the text, and to analysis of texts for co-occurrence of words, and to the use of said extraction and analysis for inferring implicit (causal, associative, etc) relationships among objects in sequences thereof.

The present invention is particularly useful in extending the utility of search engines to index and retrieve information represented by a sequence of objects different from text information objects.

Particular embodiments of the present invention are described as examples of a search engine that creates and uses information encoded in hit lists.

A BRIEF DESCRIPTION OF DRAWINGS

The following examples are meant to illustrate, but in no way to limit, the present invention.

BACKGROUND OF THE INVENTION

Those skilled in the art know of search engines and indices utilized therein, which are used to find information in unstructured textual data situated in a file system, in a local area network or the Internet, as well as textual data containing markup and embedded objects such as graphics, music, video, etc.

Figure 1:
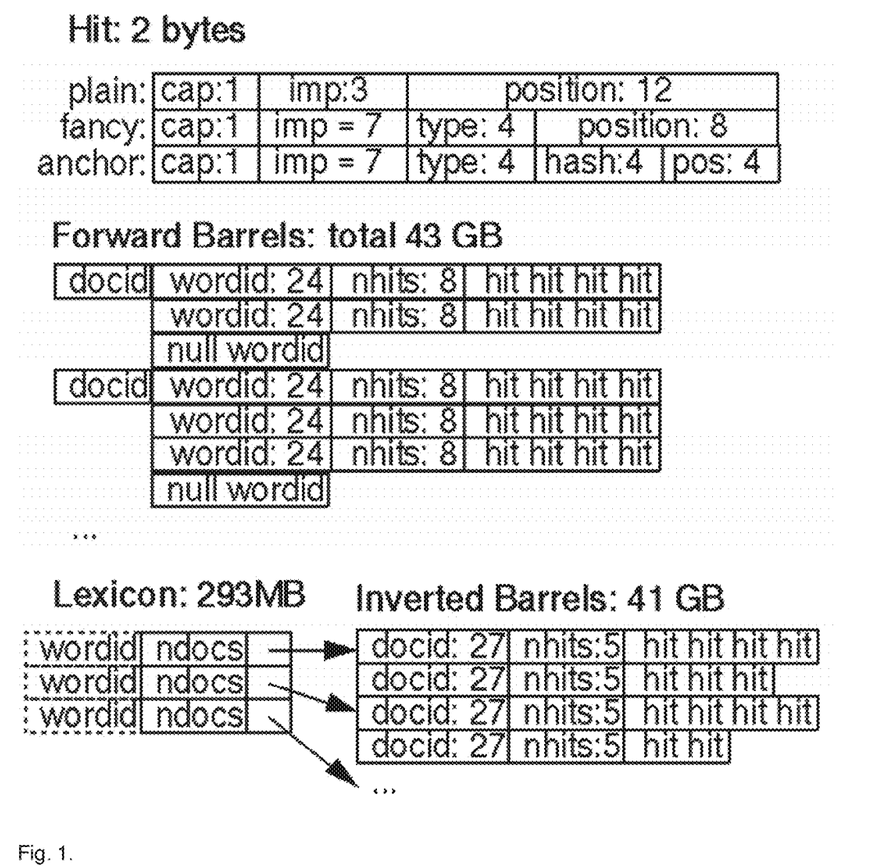
FIG. 1 Hit list of a search engine as described in "The Anatomy of a Large-Scale Hypertextual Web Search Engine" (1), Sergey Brin and Lawrence Page.

The prototype of a search engine's index is the index in a paper book, which has been known from ancient times. Such an index is usually situated at the beginning or the end of a paper book and contains a list of the keywords mentioned in the book. For each keyword, the numbers of pages where the word is mentioned are given. The Internet search engines using prior art have indices organized analogously. An index contains a list of known words of a language (lexicon), where each is assigned a unique identifier (wordID), a list of indexed documents, where each is assigned a unique identifier (docID), and each occurrence of the word identified by wordID in the document identified by docID is represented by a hit. A hit is a record (c.f. FIG. 1) that contains the position of the sought word (wordID) in a document (docID).

U.S. Pat. No. 5,265,244 G06F 17/30 (20060101); G06F 012/00 teaches of methods of creating an index, but does not disclose the content of the statistical data contained therein. U.S. Pat. No. 6,490,579 (G06F 17/30 (20060101)I G06F 017/30) discloses of a search engine and a method utilizing contextual information in a search query. U.S. Pat. No. 7,925,641 (G06F 17/30 (20060101); G06F 7/00 (20060101)) discloses of indexing a web page and storing in a search engine's index of the URI attribute and the content of the page at the time of indexing.

Sergey Brin and Lawrence Page, in "The Anatomy of a Large-Scale Hypertextual Web Search Engine", hereafter referenced as (1), teach of encoding statistical information in the hit lists of the index of a search engine. For greater relevance of the results of an Internet search, the search engine stores in its indices the attributes related to HTML markup and hyperlinks. FIG. 1 illustrates that hits of the search engine contain the position of a word in the numbered list of words in the text of a document.

The encoding of hits is explained in "4.2.5. Hit Lists" of (1) as follows:

> There are two types of hits: fancy hits and plain hits. Fancy hits include hits occurring in a URL, title, anchor text, or meta tag. Plain hits include everything else. A plain hit consists of a capitalization bit, font size, and 12 bits of word position in a document (all positions higher than 4095 are labeled 4096). Font size is represented relative to the rest of the document using three bits (only 7 values are actually used because 111 is the flag that signals a fancy hit). A fancy hit consists of a capitalization bit, the font size set to 7 to indicate it is a fancy hit, 4 bits to encode the type of fancy hit, and 8 bits of position. For anchor hits, the 8 bits of position are split into 4 bits for position in anchor and 4 bits for a hash of the docID the anchor occurs in. This gives us some limited phrase searching as long as there are not that many anchors for a particular word. We expect to update the way that anchor hits are stored to allow for greater resolution in the position and docIDhash fields. We use font size relative to the rest of the document because when searching, you do not want to rank otherwise identical documents differently just because one of the documents is in a larger font.

Persons skilled in the art will understand from (1) that a hit of the search engine encodes information on only one particular word (wordID) situated at a particular position in a particular document (docID). Such a hit will be referred to as "basic" hereafter.

More generally, as was explained above, the occurrence in a text of a word is represented in an index by a basic hit, which depends on a set of variables (cap, type, size, docID, wordID, position), thus a basic hit may be regarded as a function of said variables:

Basic Hit=function(cap, type, size, docID, wordID, position)

Closest to the present invention is the method of indexing disclosed in Russian Federation Patent RU 2273879, which relates to a method of synthesis of a self-learning system for extraction of knowledge from textual document for search engines, which indexes textual information, wherein the index contains data on the previous word and the next word with regard to the subject of the search. This allows for indexing, searching and extracting digital information from an index.

SUMMARY OF THE INVENTION

Figure 3:
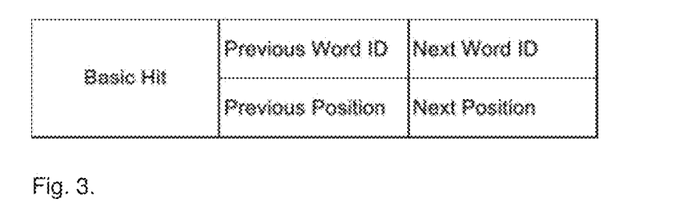
FIG. 3. Extension of the basic hit with the fields "previous word" and "next word". The positions of the previous word and the next word are specified.

The present invention advances the state of the art by introducing the "extended hit", wherein, in addition to the information of the basic hit, at least the following information is contained (c.f. FIG. 3): wordID of the "previous word", the position of which in the document is the position of the current word minus 1 (one); wordID of the "next word", the position of which in the document is the position of the current word plus 1 (one).

Figure 4:
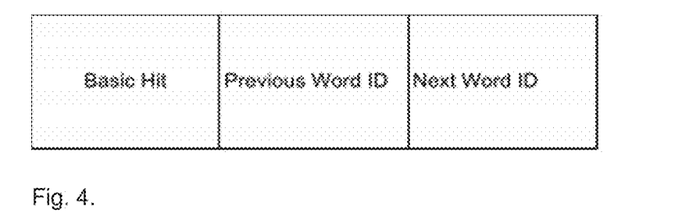
FIG. 4. Extended hit, where the positions of the previous word and the next word are not specified. They are computed using the position in the basic hit.

While FIG. 3 demonstrates a particular embodiment of the extended hit where the positions of the previous word and the next word are specified, these positions may also be computed, thus another embodiment of the extended hit (c.f. FIG. 4) may not contain the positions of the previous word and the next word, which helps reduce the storage required for the hit.

The docID field for all the three words is identical, because all the words are sequential words of a document identified by docID.

Symbolically, the occurrence of a word in a document can be described as a function:

Extended Hit=function(cap, type, size, docID, position, previous wordID, next wordID) or Extended Hit=function(Basic hit, previous wordID, next wordID)

The conversion from the basic hit used in prior art to the extended hit, as disclosed in the present invention, will facilitate restoring the original text from an index, and increase the efficiency of the co-occurrence analysis in comparison with the efficiency of the analysis that uses only the basic hits.

Figure 5:
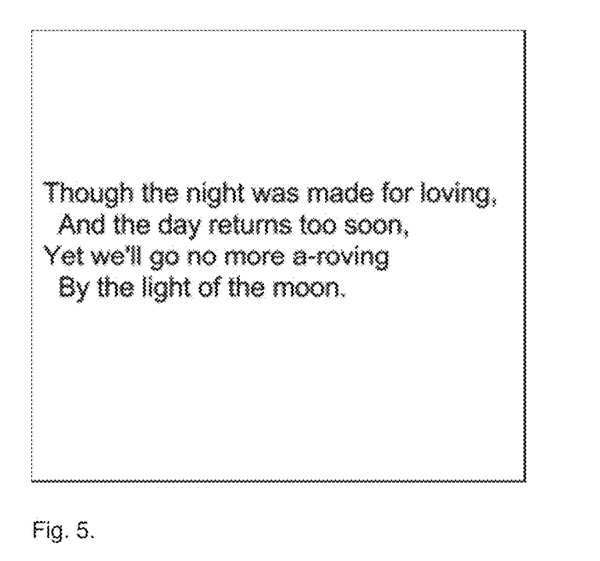
FIG. 5. A text sample for indexing.
Figure 6:
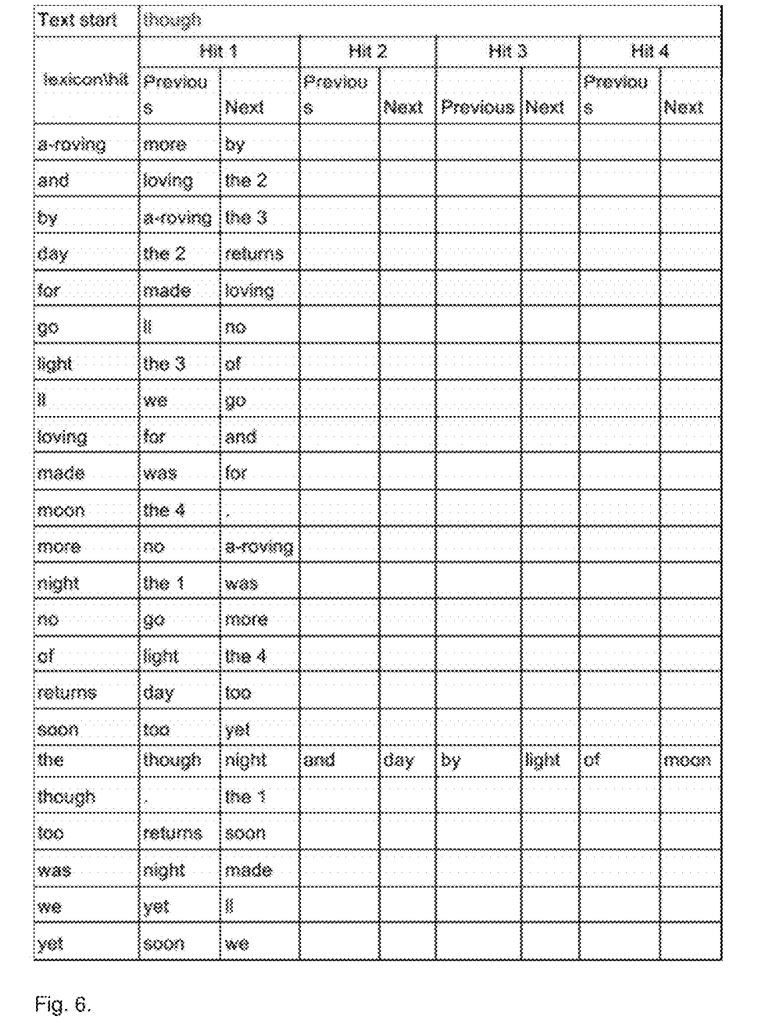
FIG. 6. A hit list example for a recursive index created from the text in FIG. 5.

FIG. 6 demonstrates the content of the extended hits in a recursive index created for the text shown in FIG. 5.

DETAILED DESCRIPTION OF THE INVENTION

Recursive Extraction of Text

Figure 7:
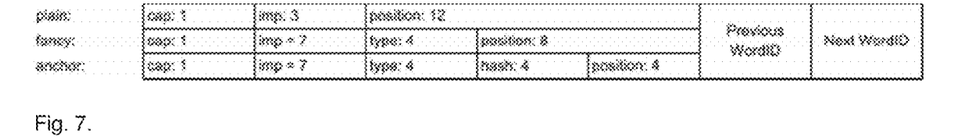
FIG. 7. Extended hit based on the structure of the basic hit.

In a particular embodiment, the extended hit is based on the basic hit, and the index is created for textual information (c.f. FIG. 7).

Said embodiment is used for recursive extraction of the original text, as disclosed herein, which was not possible in prior art.

For brevity, let <wordID−1>denote "previous wordID", and <wordID+1>denote "next wordID", while keeping in mind that the position of the previous word in the text is <position−1> and the position of the next word in the text is <position+1>. Further, let Start Hit=Extended Hit(wordID, docID, position, <wordID−1>, <wordID+1>)

which specifies the starting hit for text extraction.

To extract (restore) the original text from the index, perform the following steps:

Step 1. Get <wordID+1> from Start Hit.

Figure 8:
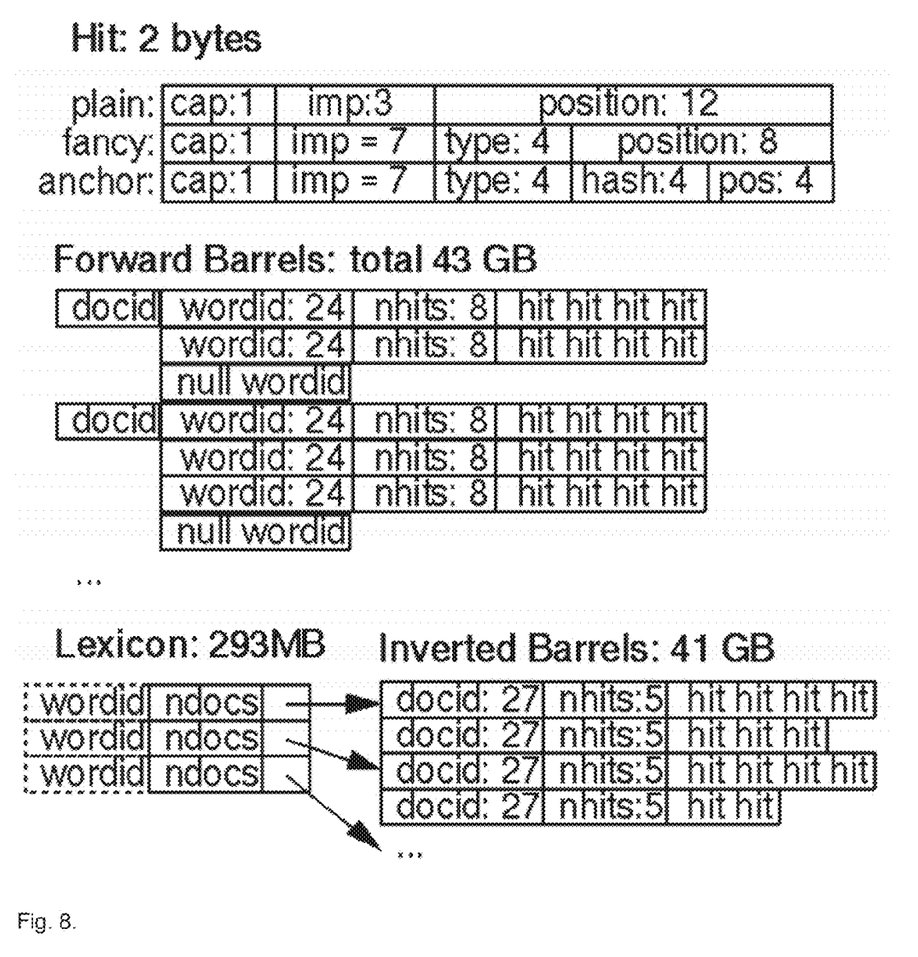
FIG. 8. Forward and inverted indices (barrels) from (1).

Step 2. In the lexicon list (c.f. FIG. 8), locate the entry for <wordID+1> and, in the inverted index, locate Next Hit:

Next Hit=Extended Hit(<wordID+1>, docID, position+1, wordID, <wordID+2>)

Step 3. Get <wordID+1> from Next Hit.

Step 4. Repeat steps 2-3, obtaining <wordID+2>, <wordID+3>, . . . , <wordID+N> until some particular N or some particular "stop" wordID.

The result of the steps above is the list of words <wordID>, <wordID+1>, <wordID+2>, . . . , <wordID+N>. Those skilled in the art will appreciate that the algorithm described above can also be reversed to obtain <wordID−N>, . . . , <wordID−1>.

Thus, said embodiment can restore the text of an indexed document entirely, or within certain limits. The limits can be specified either as the number of words to extract, or as a stop word, or any other stop condition. An example of the stop word is the period (full stop), which separates sentences, in which case the extraction will continue till the end or the beginning of a sentence. Another example of a stop word is any word whose first letter is capital (which is signified by the cap field in the basic hit), a word with another attribute. In like manner, multiple sentences can be restore from an index. The stop condition can be any condition that can be formulated for a search engine.

The presence of the "capital letter" (cap) and other text formatting attributes in the hits makes it possible to restore text to a certain degree of faithfulness to the original. Extending the number of attributes to the number of attributes used in text editors will make it possible to restore text very closely or identically to the original.

Another aspect of the present invention is related to its ability to index not only text, but also arrays of information of arbitrary nature, which are sequentially ordered by their position. For non-textual objects, the sequence of restored objects may, for example, be <previous object N> . . . <previous object 2> <previous object 1> <object> <next object 1> <next object 2> . . . <next object N>, or, with a stop object: <stop object> . . . <previous object 2> <previous object 1> <object> <next object 1> <next object 2> . . . <stop object>

The presence in the extended hits of the previous object and the next object make it possible for the index to refer to itself to extract the i-th previous object or the i-th next object, whose positions in the ordered sequence are position−i and position+1, respectively. Because of said self-reference, the index disclosed in the present invention is called the "recursive index".

The ability to restore the text of the original document, fully or partially, by extracting it from the recursive index makes possible a number of advantageous embodiments. A number of such embodiments are described herein.

Indexing Non-Textual Objects

Figure 9:
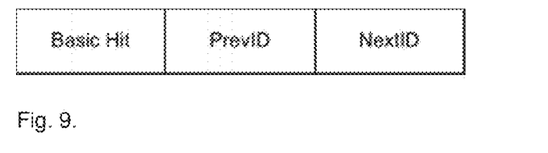
FIG. 9. An extended hit can describe an object of any nature as disclosed in the present invention.

Because the contemporary information frequently includes, in addition to texts, among others, geodesic or geographic information, media information, and an ever growing multitude of other data types, a particular embodiment of the present invention uses identifiers for objects of arbitrary nature instead of wordID. Libraries can contain not only textual documents, but also video materials, pictures, audio files, geolocation data, and any other files. The extended hit in this embodiment will include the library type libraryID, the source identified sourceID (instead of docID), and the object identifier objectID (instead of wordID), and so on. FIG. 9 demonstrates an encoding of the extended hit for objects of arbitrary nature (including text), where the basic hit encodes the current object, the nextID field identifies the object following the current object in the ordered sequence of objects, and the prevID field identifies the object preceding the current object in the ordered sequence of objects Metadata in the Recursive Index Many current media file formats support rich metadata. For example, this is ID3 tags in MP3 files, metadata in MPEG4, the Karaoke prompt data, TimedText for subtitles, etc.

Figure 10:
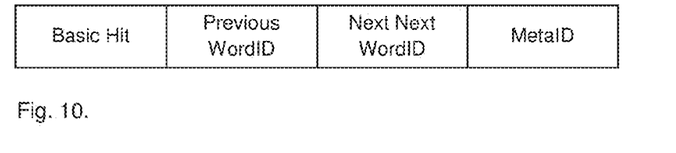
FIG. 10. Additional MetaID field; the field can can be used as a pointer to metadata, e.g., ID3v2 tags.

A particular embodiment of the present invention has a metaID field in the extended hit structure (c.f. FIG. 10). The metadata referenced by the metaID field extend the basic hit, which contains the position of the object. Because metadata for MP3, MPEG4, Karaoke, TimedText, etc, may be different, the metaID field contains a pointer to the metadata storage.

The extended hit of a search engine can be used advantageously in many other embodiments, for example, to store a ranked list of search queries as metadata in the temporal recursive index for rating of search queries; to store in the temporal recursive index a recipe, where the metadata will be the descriptions of ingredients, their quantities, temperature, the description of cooking utensils, and other particulars of preparation; to store in the index the sequence of steps in a chemical synthesis; to store the sequence of cartographic points of a road or an itinerary; etc.

Co-occurrence Analysis

Figure 11:
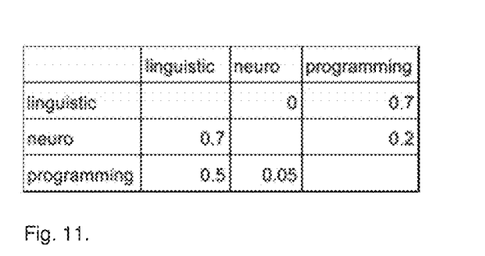
FIG. 11. An example of the co-occurrence table.

An analysis of co-occurrence of words in a language can establish which collocations are stable, and which are not. Some of the stable collocation can be notions, which cannot be described by a single word. An example of such notion is "Neuro-Linguistic Programming". Obviously, the occurrence of words in the sequence "neuro linguistic programming" is far more frequent than the occurrence in "programming linguistic neuro". In the example, the collocation "neuro linguistic programming" is the notion "NLP". Determining the difference in likelihoods of a given group of words to form a particular stable collocation ("anisotropy of co-occurrence") makes it possible to hypothesize on implicit relationships among words and notions, in particular, causal and associative relationships. For example, a co-occurrence table (c.f. FIG. 11) has (artificial) likelihoods of co-occurrence of the words present in "neuro linguistic programming".

Suppose (c.f. FIG. 11) the collocation "neuro linguistic" and "linguistic programming" have the identical likelihood 0.7. Yet the two-dimensional table cannot be used to determine the likelihood of the co-occurrence of "neuro linguistic programming", which would require a three-dimensional table.

More generally, an analysis of two-word co-occurrence among N words requires a two-dimensional N×N table, where each cell is the likelihood of co-occurrence of two words. An analysis of three-word co-occurrence requires an N×N×N table, and so on, with the difficulty of the problem increasing exponentially.

Because the basic hits used in prior art contain the position of only one word, a search for collocations or a frequency analysis of many-word co-occurrence requires an $N^G$ table, where G is the number of words in a collocation. This explains why the search engines using prior art cannot find phrases with more than three words efficiently.

Those skilled in the art will thus appreciate that the recursive index can be used advantageously to reduce significantly the complexity of a G-word co-occurrence analysis for a language of N words, by replacing a multidimensional analysis of an $N^G$ region, with an analysis of a reduced region of radius $R_\geq$, which is disclosed herein in more detail.

Use of the Recursive Index for Co-occurrence Analysis

To analyze co-occurrence, for example, of the word "linguistic", a particular embodiment of the present invention extracts (using the method disclosed herein) from a recursive index all the sequences of words containing "linguistic", with the condition that the sequences have no more than R words before or after "linguistic". Thus, if the word "linguistic" is mentioned in a number of sentences in one or multiple documents, the result of the extraction can be visualized as a "sphere of words", of the radius R words, centered on the word "linguistic".

In another embodiment, the extraction is limited by the beginning and the end of a sentence. An example of a sphere limited by the beginning and the end of a sentence, centered on "Tiger", is given in FIG. 12. When the beginning and the end of a sentence are used as stop conditions for extraction, the radius of the sphere is not R words, but R sentences.

Said embodiments then analyze the co-occurrence of the word "linguistic" with the other words in the volume of the extracted textual sequences. All the collocations "neuro linguistic programming" will be found if R=1 word or R=1 sentence. Those skilled in the art will appreciate that an analysis of this collocation in said radius is feasible even for a desktop computer. It will then be understood that the recursive index and the embodiments using the extended hits solve the problem of search and co-occurrence analysis substantially more efficiently than the search engines using prior art.

Figure 12:
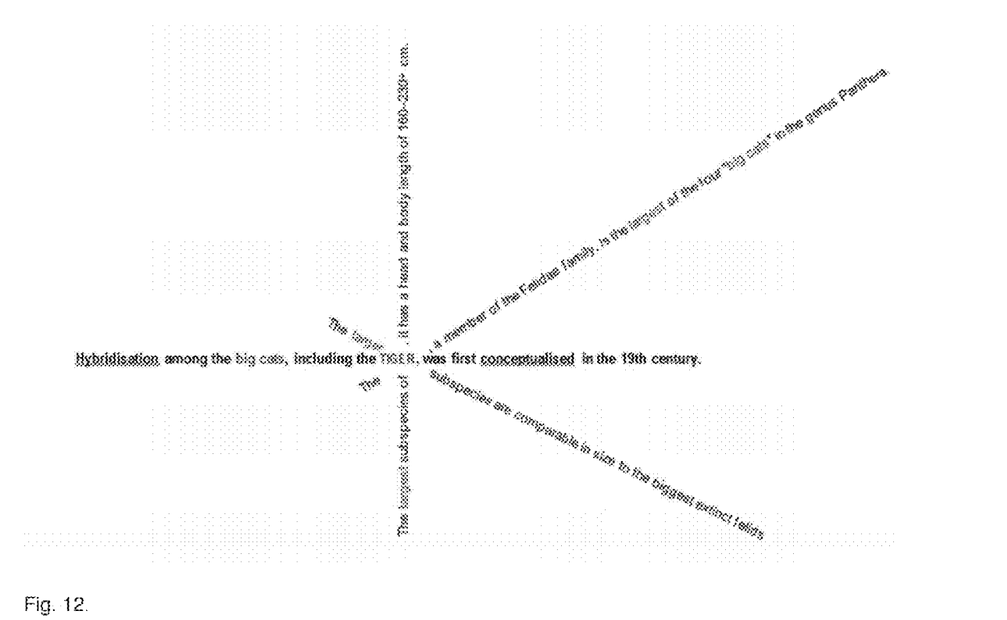
FIG. 12. An example of extraction from a recursive index of sentences having the word "tiger".

FIG. 12 demonstrates sequences containing the word "Tiger" extracted from a recursive index with R=1 sentence. All the sentences in this particular example are part of one document, but are related to different hits for the word "Tiger" in the document. A recursive index can just as easily extract sentences from many available documents. The sequences repeatedly contain the words "large", "big" and "cat", from which a possible relationship of the word "Tiger" with "big", "cat", and "large" can be inferred. The words "big" and "cat" are present together, twice, which may be indicative of a stable collocation "big cat".

The stability of an arbitrary collocation word1 word2 can be examined by extracting from a recursive index all the word sequences centered on word1. To analyze the stability of the collocation in the inverse direction (word2 word1), all the word sequences centered on word2 can be extracted. Then, if the frequency of word1 word2 is substantially greater than that of word2 word1, this means that word1 word2 is stable, while word2 word1 is ad hoc.

For example, extracting the sequences centered on "big" and on "cat", and analyzing the co-occurrence of "big" and "cat" can determine whether the collocation "big cat" is stable or ad hoc. The data on FIG. 12 indicate that "big cat" is probably stable, while "cat big" may be non-existent.

Co-occurrence of words (or other objects) can be more general than merely collocational.

The words "fire" and "smoke" may not have a stable collocation, yet they have a causal relationship, due to which their co-occurrence in a text is more likely than the co-occurrence of words without a causal relationship. This likelihood will be magnified on a large corpus of texts. It can also be expected that the co-occurrence of words may have preferred direction, e.g., the likelihood of "fire smoke" may be higher than "smoke fire", which may be indicative of a causal relationship between words or notions.

A co-occurrence analysis of collocations having three words and more may reveal stable collocations previous-word(i) next-word(j), which may further reveal a relationship between previous-word(i) and next-word(j). If previous-word(i) occurs with current-word, and current-word occurs with next-word(j), and previous-word(i) occurs with next-word(j) directly, the relationship between previous-word(i) and next-word(j) is likely associative, because the relationship is bound with current-word, but is not directly linked to it, so current-word is likely an associative link between previous-word(i) and next-word(j). A difference in the frequencies of the co-occurrences of previous-word(i) next-word(j) and of next-word(j) previous-word(i) can be used to deduce a causal relationship in an associative sequence of words or other objects.

Indexing of Discovered Notions

Notions described by multiple words are difficult to search for in prior art, because the basic hit in prior art describes the position of a word, not of a notion. Because the individual words describing a notion have individual meanings different from the meaning of their stable collocation (the notion), basic hits may frequently result in irrelevant search results when the notion is searched for. Notions are frequently denoted by acronyms, thus becoming a new "word" in a language.

The collocations that are a trademark, or a slogan, the name of song or a film are also stable and are used as identifiers for products, films, songs and other subjects of intellectual property. Automatic discovery of such stable collocations is also difficult in prior art.

As disclosed herein, the recursive index can be used efficiently to analyze words for co-occurrence and discover stable collocations representing a notion, a slogan or a name. As explained above, one particular embodiment of prior art uses imp=7 as a flag denoting a fancy hit.

Figure 13:
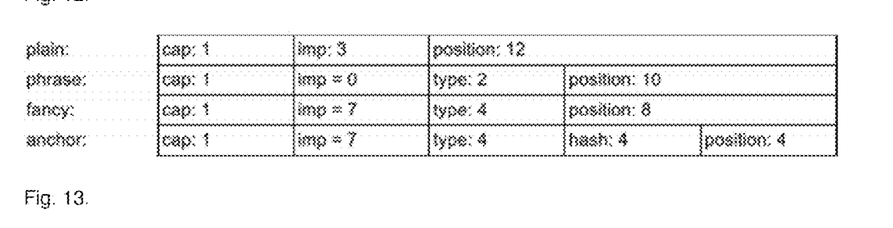
FIG. 13. An extended basic hit table, with additional record type "phrase".

An advantageous embodiment of the present invention, as shown in FIG. 13, extends the functionality of the basic hit by encoding stable collocations (denoted as "phrase" in the figure) with a flag signifying a hit for a stable collocation (the figure uses imp=0 as the flag; type=2 encodes the number of words in the collocation, and 8 bits of position are relevant for the first word in the collocation).

Figure 2:
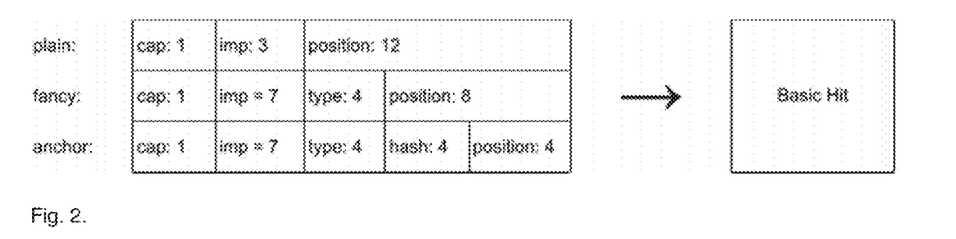
FIG. 2. Basic hit.

Those skilled in the art will understand that FIG. 2 and FIG. 13 are only illustrative and their limitations shall not be interpreted as the limitations of the present invention. Particular embodiments of the present invention may use more fields, more storage allocated for each field, fields of varying lengths, etc, as is well known to the persons skilled in the art.

Indexing of Discovered Implicit Relationships

A particular embodiment of the present invention uses the metadata field metaID in an extended hit, which contains a pointer to a file of objects associatively or causally related with the hit in the context of a particular document. Each particular hit (out of many for a particular wordID found in multiple documents) has a unique metaID corresponding to the context of the word identified by wordID in the particular hit.

Preferred Embodiments of the Recursive Index

Textual Recursive Index

Figure 14:
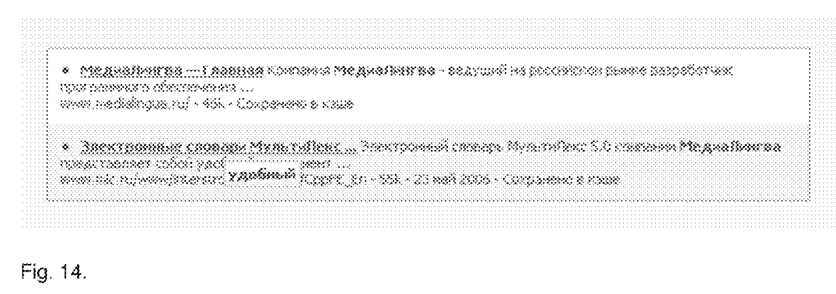
FIG. 14. The initial form of a snippet, the word "удобный" (Russian for "convenient") is selected.
Figure 15:
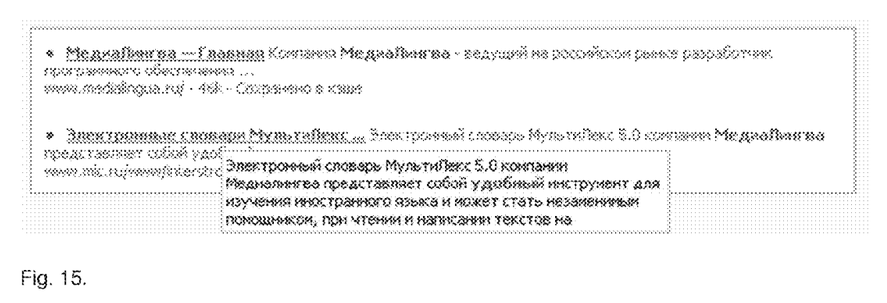
FIG. 15. The form of the snippet after the word "удобный" (Russian for "convenient") has been "pulled out". This is the effect of "zooming into" or extraction from an index of text centered on the previously selected word XXX.

In this embodiment, a search engine's user interface is enhanced via the use of a recursive index. The user can use a pointing device to "pull out" sequences of words from a snippet in a search result, wherein the sequences are extracted from a recursive index via the method disclosed herein. The text thus "pulled out" helps the user understand with a minimal effort how relevant the search result is for the user's search query. "Pulling out" and "zooming into" text in snippets is illustrated in FIG. 14 and FIG. 15. To "zoom into" is here synonymous with to "pull out" and is achieved using the method of text extraction from a recursive index before and after the selected word, with the subsequent display of the text "zoomed into" in the user interface.

Spatial and Temporal Information in a Recursive Index

The basic hit is not sensitive to the position in space and time, because it only contains the position of a word in a text (c.f. FIG. 2). For video and audio documents (of a conversation, of a speech, of events, etc), spatial and temporal location may be essential.

Figure 16:
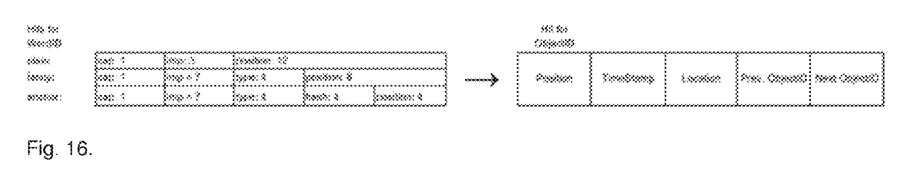
FIG. 16. An extended hit with a timestamp and a location field.
Figure 17:
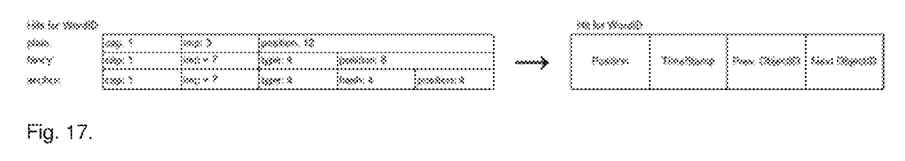
FIG. 17. An extended hit with a timestamp.

A particular embodiment of the present invention has the fields <TimeStamp> and/or <Location> in the extended hit, which are used to store the time and/or place where an event occurred. Those skilled in the art are well aware of multiple digital formats that can be used to store time and location data, and said formats can be advantageously used in said fields. FIG. 16 illustrates.

An index comprised of such extended hits can be used, for example, to store objects recognized from a video file or stream captured by a video camera mounted, for example, on a moving vehicle.

In another embodiment of the present invention, the extended hit has the field <TimeOffset>, which is used to store the duration of a period of time after some known event.

Another embodiment of the present invention that uses <TimeStamp> or <TimeOffset> in the extended hit can, for example, convey the tempo of speech. In such an embodiment the values of wordID, nextID and prevID are spoken words, codes of images recognized from a video, or digital objects of other nature that are related chronologically.

Indexing the Worldview with a Recursive Index

It is known that the worldview of a human being is created from the information transferred into the brain via sensory channels (vision, audition, gustation, olfaction, tactition, thermoreception and others). This information can be digitized and captured in a chronological order.

A particular embodiment of the present invention uses a recursive index to store the digital objects representing the information captured for one or multiple human sensory channels using the method of the present invention as disclosed herein.

Another embodiment of the present invention uses a spatial and/or temporal recursive index to store the digital objects representing the information captured for one or multiple human sensory channels using the method of the present invention as disclosed herein.

These and other embodiments of the present invention can be advantageously used to search for sensory information, extract temporal sequences of sensory data objects, and analyze co-occurrence of said objects. The timestamps can be advantageously used to synchronize the reproduction of digitized sensory data from multiple recursive indices, and the location data can be used to correlate the sensory information with the geographic or astronomic location of the place of recording.

Temporal Recursive Index

Figure 18:
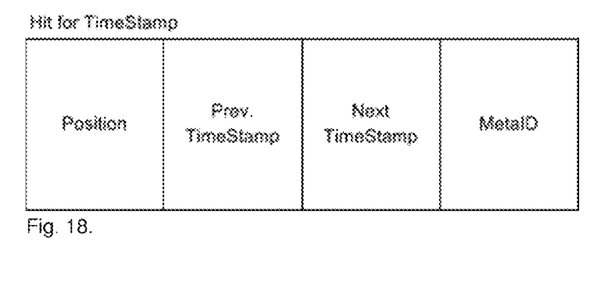
FIG. 18. A temporal recursive index.

A particular embodiment of the present invention has the field TimeStamp instead of wordID in the extended hit (c.f. FIG. 18). The metaID field stores a pointer to metadata related to the time described by the TimeStamp field, and the fields Prev TimeStamp and Next TimeStamp store pointers to the previous timestamp and the next timestamp, respectively.

Figure 19:
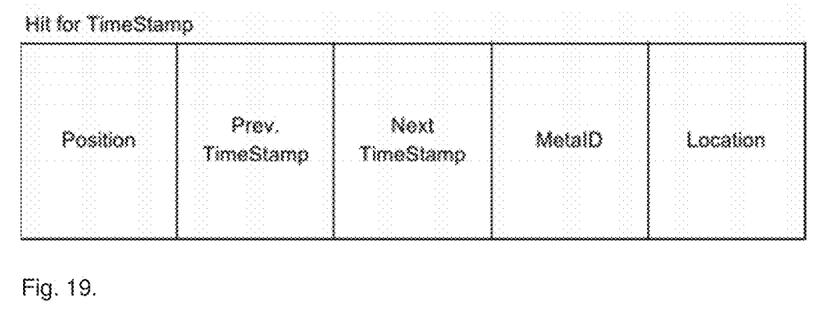
FIG. 19. A temporal recursive index with location.

Another embodiment of the present invention adds the location field to the temporal recursive index (c.f. FIG. 19).

Spatial Recursive Index

A characteristic feature of the present invention is sequencing of indexed objects, which can be advantageously used, for example, to index recursively a sequence of geographical coordinates and/or street addresses that represent, for example, an itinerary or cartographic data for a road network.

Figure 20:
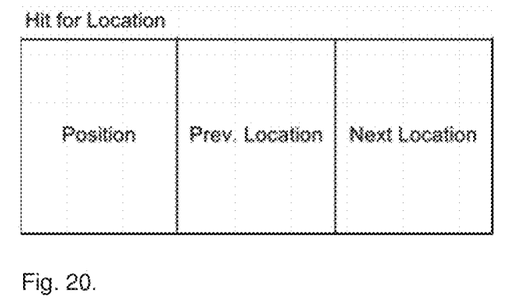
FIG. 20. An extended hit of a spatial recursive index.
Figure 21:
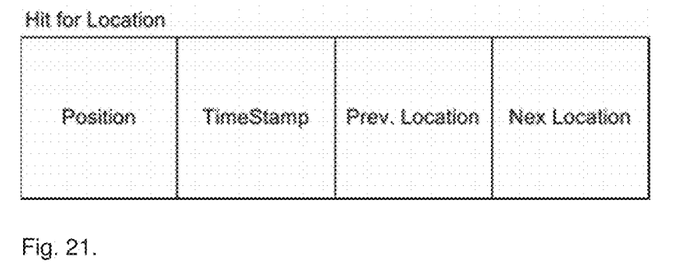
FIG. 21. An extended hit of a spatial recursive index with a timestamp.

A particular embodiment of the present invention stores street addresses or geographical coordinates in a recursive index instead of the wordID field (c.f. FIG. 20, FIG. 21).

Hardware Implementation of the Recursive Index

A particular embodiment of the present invention is a hardware module (a microcontroller, a system-on-chip, and the like, as will be understood by those skilled in the art) that can be embedded into any device or apparatus processing information. The hardware module implements the methods of the present invention disclosed herein and can be used to index images recognized from video streams, speech, and any other digital, and search in said data efficiently.

A Distributed Recursive Index

In a particular embodiment of the present invention, a recursive index is stored on each computer of a network (or the Internet) that has been indexed, with the plurality of these recursive indices forming a single distributed recursive index.

The users of the network access the local recursive indices without using a search engine, using the hardware module disclosed herein. A particular embodiment of the present invention uses a distributed recursive index for the global computer network (the Internet).

Enhancing Relevance of a Search Engine

A particular embodiment of the present invention is a search engine that accepts, in addition to a search query, a sample text. The sample text is used to build a temporary recursive index, which is then used to analyze co-occurrence of the words in the search query with the words in the sample text, using the methods of the present invention disclosed herein.

Then the search is performed in the main recursive index of the search engine, and each search result is analyzed for co-occurrence with the words in the search query, using the methods of the present invention disclosed herein.

The results of the analysis of the search results in the main recursive index are compared with the results of the analysis of the sample text. The search results that are comparable in co-occurrence with the sample text are returned to the user as relevant, and the other results are discarded.

Examples of other Particular Embodiments of the Recursive Index

A particular embodiment of the present invention indexes video information: films, reportages, video surveillance, photography, and so on. Video materials can be indexed with both the textual recursive index and the temporal recursive index. In a particular embodiment, a textual recursive index of subtitles, recognized speech or text contains video images of recognized faces or objects in metadata. Another advantageous embodiment stores video frames, recognized images and text in a temporal recursive index. Those skilled in the art will appreciate that further embodiments of the present invention can be advantageously employed to search in video materials for recognized video and photo images, for recognized text and text supplied with the video and photo materials, to search as presently disclosed in real time, and embed into or attach such advantageous embodiments to image capturing apparatuses, such as, for example, photo and video cameras, portable telephones and other portable apparatuses capable of image capture, as well as computers and other apparatuses capable of image playback.

The Recursive Index in Media Files

The textual prompt in a "Karaoke" system or subtitles in a video film are made using the Timed Text or similar means, which are specified in industrial or proprietary standards and are well known to the persons skilled in the art.

A particular embodiment of the present invention uses face, object, speech and text recognition methods well known to the persons skilled in the art to convert video and audio data from a recorded or streamed video (including films) into unique digital codes of faces, objects and text, which are then stored in a recursive index with temporal information. The embodiment then uses the method disclosed herein to search chronologically for recognized faces, objects, speech and text. Said embodiment makes it possible to search for recognized objects and to extract events preceding the occurrence of a recognized object, which was difficult or impossible in prior art. Those skilled in the art will appreciate that this and similar embodiments of the present invention can greatly reduce the difficulty of searching for objects in video surveillance records.

Another embodiment of the present invention is embedded into or attached to a telephone and uses the method disclosed herein and the methods of speech and face recognition for automatic stenography of audio or video conversations and for searching for recognized text and faces chronologically.

The MP3 and MPEG4 media files use the ID3 tagging system and other similar systems, such as the ID3v2 system. The latter system can store up to 256 megabytes of arbitrary information in a media file. A particular embodiment of the present invention uses the ID3v2 metadata to store a recursive index of subtitles in a film in all languages, and a recursive index of songs, books, recognized images, speech and text.

A particular embodiment of the present invention uses a recursive index to store the text of an electronic book. The extraction method disclosed herein is used to display the book sequentially.

Another advantageous embodiment of the present invention stores a recursive index in a tagging system, such as ID3 or any other, in a media file such as, including but not limited to, CD, MP3, WMA, AAC, AIFF, M4A, DVD, Blu-Ray, HD, MP4, AVI, MOV, RAM, SWF, WMV and extracts, as disclosed herein, fully or partially, text and/or images chronologically, searches for text and/or images as disclosed herein, analyses text and/or images for co-occurrence as disclosed herein, analyses text and/or images for causal or associate relationships as disclosed herein.

Texts in Electronic Books

A plurality of electronic book formats are well known to persons skilled in the art. A particular embodiment of the present invention stores the text and formatting of the text of an electronic book in a recursive index, such that the reader can read the book sequentially, which is done via the text extraction as disclosed herein, and search and analyse the text using the methods disclosed herein.

A Recursive Index of Cartographic Information

A particular embodiment of the present invention stores geodesic or geographic coordinates and indexes itineraries or roadmaps, taking permitted directions of travel into account.

A Recursive Index of News and RSS Feeds

A particular embodiment of the present invention uses a temporal recursive index or a textual recursive index to store timestamps for news, RSS feeds and other sources known to persons skilled in the art.

Business Models

Paid creation, and/or emplacement, and/or use of a recursive index in electronic books.

Paid creation, and/or emplacement, and/or use of a recursive index in audio books.

Paid creation, and/or emplacement, and/or use of a recursive index in electronic or digital media, said media containing cartographic information, including geodesic information.

Paid creation, and/or emplacement, and/or use of a recursive index in navigation devices or apparatuses.

Paid creation, and/or emplacement, and/or use of a recursive index in communication devices or apparatuses.

Paid creation, and/or emplacement, and/or use of a recursive index in computers, including portable computers.

Paid creation, and/or emplacement, and/or use of a recursive index in telephones, smartphones, personal digital assistants, tablets, media players, and other portable digital devices.

Paid creation, and/or emplacement, and/or retrieval of a recursive index from video media, wherein said media are CD, DVD, Blu-Ray and any other formats currently known and will be known in future, including, but not limited to, audio formats MP3, WMA, AAC, AIFF, M4A and video formats MP4, AVI, MOV, RAM, SWF, WMV.

Paid creation, and/or emplacement, and/or retrieval of a recursive index or a hyperlink to a recursive index from a web site.

Paid creation, and/or emplacement, and/or retrieval of a recursive index or a hyperlink to a recursive index from a semantic web.

Paid creation, and/or emplacement, and/or retrieval of a recursive index from a computer in a local area network.

Paid creation, and/or emplacement, and/or retrieval of a recursive index from a computer in a wide area network, including the Internet.

Paid creation, and/or emplacement, and/or retrieval of a recursive index from a search engine, wherein said search engine communicates with other computers in an arbitrary network, wherein said network uses arbitrary means of communications.

Paid creation, and/or emplacement, and/or display of advertisements, wherein said advertisements are related to data retrieved from a recursive index, wherein the relationship of said data with said advertisements is contextual or of a different nature.

Paid design, and/or development, and/or distribution and/or use of a computer program that can create extended hits of a recursive index, wherein said hits contain information on the next object and the previous objects.

Paid design, and/or development, and/or distribution and/or use of a computer program that can retrieve information from extended hits of a recursive index, wherein said information contains information on the next object and the previous objects.

Paid design, and/or development, and/or distribution and/or use of a computer program that can create extended hits of a recursive index, wherein said hits contain information on the next object and the previous objects, wherein said objects are recognized by a computer program, wherein said computer program recognizes speech, text, faces and other objects such as graphical images, and others (chemical, geodesic, etc).

Paid design, and/or development, and/or distribution and/or use of an apparatus that can create extended hits of a recursive index, wherein said hits contain information on the next object and the previous objects.

Paid design, and/or development, and/or distribution and/or use of an apparatus that can retrieve information from extended hits of a recursive index, wherein said information contains information on the next object and the previous objects.

Paid design, and/or development, and/or distribution and/or use of an apparatus that can use information from extended hits of a recursive index, wherein said information contains information on the next object and the previous objects, where said use includes co-occurrence analysis.

The invention claimed is:

1. A method of managing digital data, the method comprising:
searching, by a processor, a plurality of data sets comprising digital data;
recording, by the processor, a hit into an index for each occurrence of a unique object in one of the plurality of data sets, wherein each of the plurality of data sets comprises a numbered sequence of objects, wherein said objects are represented by unique machine-readable object values, and wherein said hit comprises an ordinal number of an occurrence of said unique object and at least one of: a value of a previous object that is positioned one unit before said unique object and a value of a next object that is positioned one unit after said unique object;
recording hit data into the index, wherein the hit data comprises at least one of: values of additional previous objects with respect to the unique object and values of additional next objects with respect to the unique object, for N objects where N is at least one;
restoring at least one of past relationship and future relationship with respect to the unique object based on the recorded hit data;
searching for at least two occurrences of the unique object in indexed data set, wherein the searching comprises gathering a value of the unique object, retrieving hits with the occurrence of the unique object in the indexed data set and other data sets from among the data sets; and
displaying the retrieved hits as search results, obtained based on the searching or recording the retrieved relationships into the memory available for a processor or an algorithm capable of analyzing the co-occurrence of the unique object with each of the N next or previous objects in the indexed data set or transferring the retrieved relationship to a processor,
wherein the search results or the memory records further comprise the restored relationships.

2. The method of claim 1, wherein the retrieved hits at least comprise the ordinal number, the value of the previous object, and the value of the next object.

3. The method of claim 1, further comprising:
restoring said at least one future relationship between multiple objects in a data set from the plurality of data sets,
  wherein the restoring of the future relationship comprises:
    assigning a variable N a value of 1, a variable Start is assigned a value of said unit from the hit of the unique object; and
    executing a loop comprising:
      retrieving the value of the next object; and
      using the retrieved value as an N-th result of the restoring;
      setting a new value of the unique object to be equal to the N-th result of the restoring;
      setting a new value of the unit for the unique object' hit to be equal to the start variable plus variable N;
      searching the index for said unique object' hit containing said unit value in said data set; and
      assigning the variable N to a value of N+1; and
      performing the loop until a loop termination condition is satisfied,
  wherein value of the next object and value of next object' number N are retrieved from each N-th result of the loop,
  wherein retrieved next objects are arranged in an order of succession of their numbers, and
  wherein the displaying or recording or transferring comprises displaying or recording or transferring a resultant numbered sequence as a result of the restoring.

4. The method of claim 1, further comprising restoring said at least one past relationship between multiple objects in a data set from the plurality of data sets,
  wherein the restoring comprises:
    assigning a variable N a value of 1, a variable Start a value of said unit from the hit of the unique object; and
    executing a loop comprising:
      retrieving the value of the previous object;
      using the retrieved value as an N-th result of the restoring;
      setting a new value of the unique object to be equal to the N-th result of the restoring;
      setting a new value of the unit for the unique object' hit to be equal to the start variable minus variable N;
      searching the index for said unique object' hit containing said unit value in said data set; and
      assigning the variable N to a value of N−1; and
      performing the loop until a loop termination condition is satisfied,
  wherein value of the previous object and value of next object' number N are retrieved from each N-th result of the loop,
  wherein retrieved previous objects are arranged in an order of succession of their numbers, and
  wherein the displaying or recording or transferring comprises displaying or recording or transferring a resultant numbered sequence as a result of the restoring.

5. The method of claim 3, wherein:
the searching is performed in at least one machine-readable data set, which is a numbered sequence of objects,
a result of the searching is a bounded set of hits that represent occurrences of search object in said at least one data set;
the loop termination condition in the future restoration operation is set prior to the loop,
the future restoration operation is performed for each hit in said bounded set of hits, and
applying said loop termination condition to end the loop, and obtaining a bounded set of future objects.

6. The method of claim 4, wherein:
the searching is performed in at least one machine-readable data set, which is a numbered sequence of objects,
a result of the searching is a bounded set of hits that represent occurrences of search object in said at least one data set,
the loop termination condition in the past restoration operation is set prior to the loop,
the past restoration operation is performed for each hit in said bounded set of hits,
applying said loop termination condition to end the loop, and
obtaining a bounded set of past objects.

7. The method of claim 5, further comprising analyzing object co-occurrence in the obtained bounded set of future objects.

8. The method of claim 6, further comprising analyzing object co-occurrence in the obtained bounded set of past objects.

9. The method of claim 5, further comprising analyzing object co-occurrence in the obtained bounded sets of past object simultaneously with an obtained set of future objects.

10. The method of claim 1, wherein at least one of a TimeStamp and a TimeOffset are stored in the hit and wherein, in the searching, at least one of the TimeStamp and TimeOffset are retrieved and the search objects are chronologically arranged.

11. The method of claim 1, wherein at least one of a Location and a LocationOffset are stored in the hit and wherein, in the searching, the at least one of the Location and the LocationOffset are retrieved and locations of search objects are spatially organized.

12. The method of claim 1, wherein at least a MetaID pointer is stored in the hit and wherein, in the searching, the MetaID pointer is retrieved and used to access a metadata of search objects.

13. The method of claim 1, wherein the object's values are at least one of a TimeStamp and a TimeOffset, and the numbered sequence of objects is the numbered sequence of values of the at least one of the TimeStamp and the TimeOffset accordingly.

14. The method of claim 1, wherein the object's values are at least one of Locations and LocationOffsets, and wherein the numbered sequence of objects is a numbered sequence of the Locations and LocationOffsets accordingly.

15. The method of claim 1, wherein the data sets are files or streams of data containing the sequences of objects and wherein the method further comprises: prior to said recording:
  recognizing the objects;
  assigning a number to each of the recognized objects; and
  using the assigned numbers, arranging the set of the recognized objects as the numbered sequence of objects,
  wherein the numbered sequence of objects is used to index files or streams of data.

16. The method of claim 15, wherein:
said files or streams of data are video files or audio files or video data streams, or audio data streams, the objects are words of at least one of speech, sounds, collections of sounds, faces, objects, collections of objects, sets of points, symbols, letters, digits, and words of text, and the recognizing comprises at least one of speech recognition, sound detecting, face recognition, object recognition, optical character recognition, and text detection.

17. The method of claim 16, wherein the data sets are in one of the following audio formats: CD, MP3, WMA, AAC, AIFF, and M4A, or in one of following video formats: MPEG4, AVI, MOV, RAM, SWF, WMV, DVD, and Blu-Ray.

18. The method of claim 15, wherein said indexing is performed simultaneously with recording or playback of the data sets.

19. The method of claim 17, wherein the index is stored in an ID3 or upper version tag file.

20. The method of claim 15, wherein the index is stored at a web site for its searching, or on information media, or in a portable memory device, or in the memory of a device for recording and/or playback of machine-readable data sets, or in the memory of a communication device.

21. The method of claim 20, wherein the index is stored with the data sets.

22. The method of claim 20, wherein the information media is one of a CD disk, a DVD disk, and a Blu-Ray disk.

23. The method of claim 15, wherein the objects are one of geodesic and relative location coordinates and wherein the value of objects is one of the Location and the LocationOffset.

24. The method of claim 15, further comprising:
computing geodesic coordinates of at least one of a Location and a LocationOffset of said recognized numbered objects appearing in the file or stream;
assigning the computed values of said coordinates to the fields of a Location and a LocationOffset in the hits of said related recognized objects accordingly.

25. The method of claim 15, further comprising:
measuring of a time or a time offset for said recognized objects appearing in the file or stream;
assigning said at least one of the time and the time offset values to the fields of the TimeStamp and the TimeOffset in the hits of said related recognized objects accordingly.

26. The method of claim 1, wherein the index is stored on at least one of a CD disk, a DVD disk, a Blu-Ray disk, another removable information medium, removable memory and in the memory of a device.

27. An apparatus capable of indexing, searching, and retrieving digital information from the index using the method of claim 1.

28. The method of claim 1, wherein the data sets are numbered sequences of textual objects in an electronic book.

29. The method of claim 1, wherein the data sets are files or stream of data in an audio book, and the numbered sequences of objects are objects recognized from at least one of speech, sounds, and collections of sounds.

30. The method of claim 1, wherein the data sets are numbered sequences of geodesic coordinates of an itinerary or a map and wherein the sequences of geodesic coordinates are indexed, and the index is stored on at least one of an information media, a portable memory device, in the memory of an apparatus.

31. The method of claim 1, wherein the data sets are numbered sequence of addresses of an itinerary or a map, wherein the sequences of addresses are indexed, and the index is stored on at least one of an information media, a portable memory device, and in the memory of an apparatus.

32. The method of claim 1, wherein the data sets are numbered sequences of words and other data located at pages of a web site, and the index is stored such that search and information retrieval from the index is obtained with and without accessing said web site or pages.

33. The method of claim 32, where the index is stored as a semantic web structure.

34. The method of claim 1, wherein the data sets are data sets of a local area network or of the Internet, and the index is stored in the memory of at least one of a search engine computer, and a device where indexed data is stored, and a user device coupled to the network.

* * * * *